(12) United States Patent
Wilds

(10) Patent No.: US 8,308,060 B2
(45) Date of Patent: Nov. 13, 2012

(54) DATA CARRIER AUTHENTICATION USING ALTERNATIVE SECURITY FEATURES

(75) Inventor: Mark Wilds, Cambridge (GB)

(73) Assignee: ITI Scotland, Ltd., Glasgow (GB)

( * ) Notice: Subject to any disclaimer, the term of this patent is extended or adjusted under 35 U.S.C. 154(b) by 22 days.

(21) Appl. No.: 12/375,209

(22) PCT Filed: Aug. 3, 2007

(86) PCT No.: PCT/GB2007/002968
§ 371 (c)(1),
(2), (4) Date: Jan. 26, 2009

(87) PCT Pub. No.: WO2008/015459
PCT Pub. Date: Feb. 7, 2008

(65) Prior Publication Data
US 2009/0250514 A1    Oct. 8, 2009

(30) Foreign Application Priority Data
Aug. 3, 2006    (GB) .................................. 0615431.4

(51) Int. Cl.
*G06K 5/00*    (2006.01)
(52) U.S. Cl. ......................................... 235/380; 235/375
(58) Field of Classification Search .................. 235/375, 235/380, 435, 439, 454, 492
See application file for complete search history.

(56) References Cited

U.S. PATENT DOCUMENTS

| | | | |
|---|---|---|---|
| 5,982,282 A | 11/1999 | Ryan, Jr. | |
| 2004/0118903 A1 | 6/2004 | Richardson et al. | |
| 2004/0164865 A1 | 8/2004 | de Velasco Cortina | |
| 2005/0060171 A1* | 3/2005 | Molnar | 705/1 |
| 2005/0107114 A1* | 5/2005 | Ocock | 455/550.1 |
| 2005/0116840 A1* | 6/2005 | Simelius | 341/22 |
| 2005/0258247 A1 | 11/2005 | Hawes | |
| 2006/0273910 A1* | 12/2006 | Narlow et al. | 340/572.7 |
| 2007/0069030 A1* | 3/2007 | Sauerwein et al. | 235/462.46 |
| 2007/0108386 A1 | 5/2007 | Krul et al. | |

FOREIGN PATENT DOCUMENTS

| | | |
|---|---|---|
| EP | 0342772 | 11/1989 |
| EP | 1610263 A1 | 12/2005 |
| JP | 4237389 | 8/1992 |
| JP | 11070924 | 3/1999 |
| JP | 2001292485 | 10/2001 |
| JP | 2002525727 | 8/2002 |

(Continued)

OTHER PUBLICATIONS

Dr. Andrew D. Dubner: "Securing The Pharmaceutical Supply Chain—The Authenticated RFID Platform", 3M, [Online], Jun. 2005, pp. 1-8, XP002463783.

(Continued)

*Primary Examiner* — Michael G Lee
*Assistant Examiner* — Matthew Mikels
(74) *Attorney, Agent, or Firm* — Moore & Van Allen, PLLC; W. Kevin Ransom

(57) ABSTRACT

A method for authenticating a data carrier that is associated with at least two security features that can be independently used to authenticate the data carrier, the method comprising using a first one of the security features to authenticate the data carrier and switching to using a second security feature in place of the first security feature in response to a switch security feature command.

34 Claims, 2 Drawing Sheets

FOREIGN PATENT DOCUMENTS

| | | |
|---|---|---|
| JP | 2002326443 | 11/2002 |
| WO | WO-03/050749 A1 | 6/2003 |
| WO | WO-03/105075 AI | 12/2003 |
| WO | WO-2004/100099 A1 | 11/2004 |
| WO | WO-2004/102490 A1 | 11/2004 |
| WO | WO-2005/204699 A2 | 3/2005 |
| WO | WO-2005/034049 A1 | 4/2005 |
| WO | WO 2005124673 A1 * | 12/2005 |
| WO | WO-2007/113448 A1 | 10/2007 |
| WO | WO 2007/128966 | 11/2007 |
| WO | WO 2008/003964 | 1/2008 |

OTHER PUBLICATIONS

International Search Report for PCT/GB2007/002968, dated Jun. 12, 2008.

Japanese Examination Report issued in JP Application No. 2009-522342, dated Jun. 4, 2012.

* cited by examiner

DATA CARRIER AUTHENTICATION USING ALTERNATIVE SECURITY FEATURES

FIELD OF THE INVENTION

The present invention relates to a method for authenticating a data carrier. In particular, the invention relates to a method for authenticating bar codes and data matrices.

BACKGROUND

High information capacity data carriers such as barcodes and data matrices (2D barcodes) have been widely utilised to encode key information about items and present it in a format that is machine readable and easily accessible to third parties. Information such as part numbers, date codes, manufacturer information and serial numbers can be encoded and read back through defined standards. The need to make the information held by the data carrier publicly available coupled with the desirability of conforming the data carrier to widely available international standards means that it is relatively simple to read, extract and copy. As such, the presence, use or reading of a basic data carrier cannot enable the authenticity of the carrier or associated item to be determined.

Existing authentication methods for security purposes are primarily concerned with the use of a single authentication technology, such as a particular tag. Such methods are at risk of having a limited lifetime until their security is compromised, at which point a new solution has to be incorporated, with the attendant problems of handling items already distributed with the existing compromised security feature. Similarly, it is often important to verify that the data in a data carrier on, or associated, with an item has not been compromised in addition to, or as part of, authenticating the item itself.

An object of the present invention is to simultaneously address the problems of security technology limited lifetime and authentication of data carriers.

SUMMARY OF INVENTION

The present invention addresses these problems by using more than one authentication feature. According to a first aspect of the invention, there is provided a method for authenticating a data carrier that is associated with at least two security features, the method comprising reading a first one of the security features; using the first security feature to authenticate the data carrier; reading a second one of the security features, and using the second security feature to authenticate the data carrier, wherein the first security feature is usable to authenticate the data carrier independently of the second security feature, and the method further involves switching to using the second security feature in place of the first security feature in response to a switch security feature command.

The switch command may be generated in the event that the first security feature is compromised. Hence, even if the first security feature is compromised, the second feature can be used in its place. This improves the security of the system. As an extension of this, one or more designated groups of security features may be used to authenticate the data carrier and then changed in response to a switch command.

The switch security feature command may be received from a controller at a remote location. The controller may be operable to send switch security feature commands to a plurality of reading locations, so that all readers in a network can be up-dated, preferably simultaneously and in real time as and when security breaches are detected. Alternatively, the readers may be up-dated the next time they are on-line, for example the next time they are within range of a control terminal with wireless connectivity. In any event, in a preferred embodiment each reader is configured to return a secure message confirming receipt of the update.

The step of using the first and/or second security feature may be required in conjunction with the step of using at least one further security feature, thereby to fully authenticate the data carrier. Using at least two security features in this way improves security, because to fraudulently authenticate the data, a counterfeiter would have to determine multiple features.

Using two or more security features in accordance with the present invention provides a level of security that is not limited to or restricted by the type of security features or data carrier used thereby providing a generic and simple solution to a complex problem.

Preferably, at least one of the security features is entangled with the data carrier. By entangled it is meant that at least one aspect of at least one of the security features is dependent on one or more features of the data carrier. This ensures that the data carrier cannot be altered or replaced without an effect detectable with the security feature.

The entanglement could be physical in nature. For example, a barcode could be printed using secure ink, the data being carried in the bar code and the security feature being embedded in the secure ink.

Alternatively or additionally, the entanglement could be data related. In this case, a secret or indeterminable relationship between the data carrier data and additional data in the security feature may be used.

In any case, the use of more than one security feature allows for multiple entanglements between security features and the data carrier and/or allows authentication to be continued in the event of one of the security features being compromised.

The data carrier may be a barcode. The data may carry information related to a product. The data carrier and/or security features may be machine-readable.

At least one, and preferably all, of the security features may be covert. The security features may be contained within the footprint of the data carriers. The security features may be incorporated into the data carrier.

Preferably the security features, whether overt or covert are machine-readable.

The security feature may be as described in our co-pending patent application GB 0613360.7, the contents of which are incorporated herein by reference.

The data carrier may be printed using a print medium, such as ink, and at least one of the security features may be included in the print medium. Preferably, the security feature is a light sensitive material, such as a fluorescent material, which is included in the print medium. Alternatively or additionally, at least one security feature may be separate from the data carrier.

Two or more security features may be readable from a single physical feature. The two or more security features may be two or more of: the presence of a fluorescent pattern; the shape of a fluorescence pattern or the fluorescence wavelength.

The method may involve verifying at a remote location data extracted from the security feature, thereby to authenticate the data carrier. Authentication may involve checking that data extracted matches or is related to a pre-determined specification. The specification may be a list of approved data values.

The first and/or second security feature may be inter-related with at least a further security feature and the method may involve using the relationship between inter-related security features to authenticate the data carrier.

According to another aspect of the invention, there is provided a system for authenticating a data carrier that is associated with at least two security features, the system being configured to switch between the security features to authenticate the data carrier.

The system is preferably configured to use a first security feature to authenticate the data carrier and switch to using a second feature in response to a switch security feature command.

Preferably, the system includes a single reader for reading both the first security feature and the second security feature. Preferably, a plurality of readers is provided at different locations. Ideally, each reader is portable, preferably handheld.

Preferably, the system includes means for determining when a security feature has been compromised.

The system may include an instrument configuration manager for controlling each reader. The instrument configuration manager may be operable to send a switch command to each reader to change the security feature or features that are being used.

The instrument configuration manager may be operable to send one or more policies to the readers. At least one of the workflow steps may define the security feature that is to be read. The policies may define one or more workflows. The workflows may specify operational steps that have to be taken, including for example the security feature that is to be read.

The system may be configured to use the first and/or second security feature in conjunction with at least one further security feature, thereby to authenticate the data carrier.

The system may include a control station that is operable to receive data captured from at least the first and second security features or data or information that is a function thereof. The control station may be operable to generate and send the switch security feature command.

According to yet another aspect of the invention, there is provided a data carrier that has associated with it two or more security features, each security feature being usable to authenticate the data carrier independently of the other security feature. Preferably, the two or more security features are covert.

At least one of the security features may be contained within the footprint of the data carrier. At least one of the security features may be separate from the data carrier. At least one of the security features may be incorporated in the data carrier.

The data carrier may be printed using a print medium, such as ink, and at least one of the security features may be included in the print medium. A fluorescent material may be included in the print medium.

Two or more of the security features may be readable from a single physical feature. The security features may be two or more of the presence of a fluorescent pattern; the shape of a fluorescence pattern or the fluorescence wavelength.

At least one of the security features may be entangled with the data carrier. The entangled security feature may be physically entangled with the data carrier, so that there is at least some physical overlap. The entangled security feature and the data carrier may be layered one above the other. At least one of the entangled security features may be associated with data in the data carrier.

A pattern or location of deposition of one or more of the security features may be related to data in the data carrier. The security feature may include data from or related to the data in the data carrier. The data carrier data in the security feature may be encrypted.

The first and/or second security feature may be inter-related with at least a further security feature. The relationship between inter-related security features may allow authentication of the data carrier.

According to still another aspect of the invention, there is provided a product or item that has a data carrier and two or more associated security features for use in the above-mentioned method or system.

BRIEF DESCRIPTION OF THE DRAWINGS

Various aspects of the invention will now be described by way of example only and with reference to the accompanying drawings, of which.

SPECIFIC DESCRIPTION OF THE DRAWINGS

Figure 1:
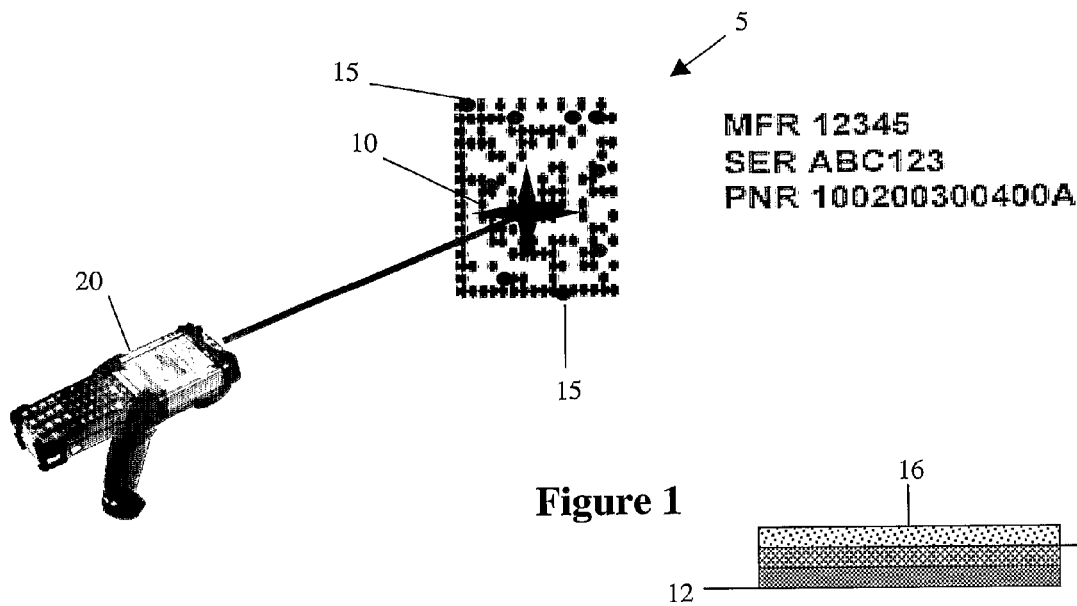
FIG. 1 shows a data carrier and reader for extracting data from that carrier.

FIG. 1 shows an overt data carrier 10, such as a barcode, a 2D barcode or a machine-readable numerical code, and multiple security features 15, preferably covert security features, arranged to allow authentication of the data carrier 10. Each security feature 15 is applied in a manner such that modification or replacement of the data carrier is detectable using the security feature. The data carrier and security features may be provided in layers. For example, one of the security features 15 could be an RFID tag 12 that is embedded within a substrate over which the data carrier 14 is printed and another of the security features 16 could be printed directly over or indeed under the data carrier, as shown in FIG. 2, thereby providing a layered data carrier/security features structure.

Authenticity may be ascertained by the simple measurement of the presence or otherwise of the covert security feature 15 or by determination of a property of it such as shape, location, size, colour or fluorescing wavelength or of data contained within it. One or more selected covert security features 15 are used initially, but if these are compromised then previously unused covert features are checked in place of compromised features. Using multiple features 15 in this way increases security because the system cannot be compromised until all the security features 15 have been discovered.

Figure 2:
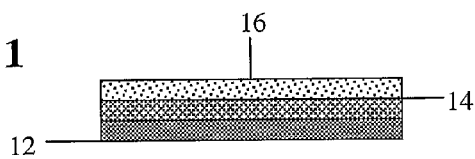
FIG. 2 shows a layered data carrier.
Figure 3:
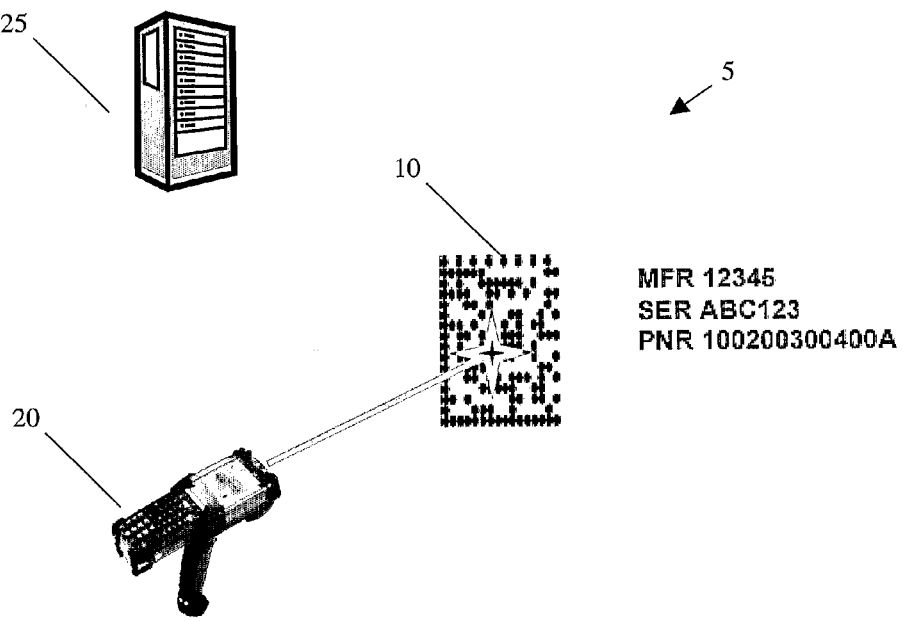
FIG. 3 is a schematic diagram of a system for remote authentication of the data carriers of FIGS. 1 and 2.

The data carriers of FIGS. 1 and 2 can be used in the authentication system of FIG. 3. This has a data reader 20 that is operable to communicate with a central server 25. Whilst only one reader 20 is shown, it will be appreciated that in practice a plurality of readers 20 would be connected to the server 25 so that an authentication network is provided allowing for central control of all of the reader devices 20. Included in the server 25 is authentication information that can be used in conjunction with the security features 15 to authenticate the data carrier. The reader may be operable to simultaneously read both data from the data carrier 10 and authentication data from the covert security features 15. To this end, the reader 20 is provided with a scanner for extracting the data, for example a bar code scanner, and any other scanning device necessary for extracting data from the covert security features 15, such as a UV light source, CCD detectors or laser based scanning devices.

Included in the reader 20 is a memory for storing collected data and scanning instructions and a processor for selecting scanning instructions and performing data processing such as decryption of coded data. Authentication data captured by the reader 20 from the security features 15 is relayed to the server 25 for on-line real time verification of data. This is particularly advantageous if the authentication data is encrypted, for example if it includes plain text encrypted with a public key of a public/private key encryption scheme and the private key is stored on the server 25. This increases the security of the system, because whilst a counterfeiter may have access to the data carrier 5, it is much harder to gain access to and reproduce data stored on the remote server 25. Additionally, if a certain covert security feature 15 were compromised, any one or more, and possibly all, of the readers 20 in the system can be centrally updated from the server 25 to switch to use a different covert security feature 15. Similarly, user permissions and key codes can be maintained centrally.

In an alternative example, the readers 20 are able to authenticate the data carrier locally or off-line, that is without reference to the server. In this case, authentication events captured at the readers would be stored at the instrument and sent to the server for later analysis to identify possible anomalies. In this case, each reader 20 has the processing capability, for example on a smart card, for interpreting the security feature, for example a MAC code embedded in the feature and this, in itself, is sufficient to authenticate the feature. Details of the authentication are typically uploaded in batches to the server 25 at a later time.

Figure 4:
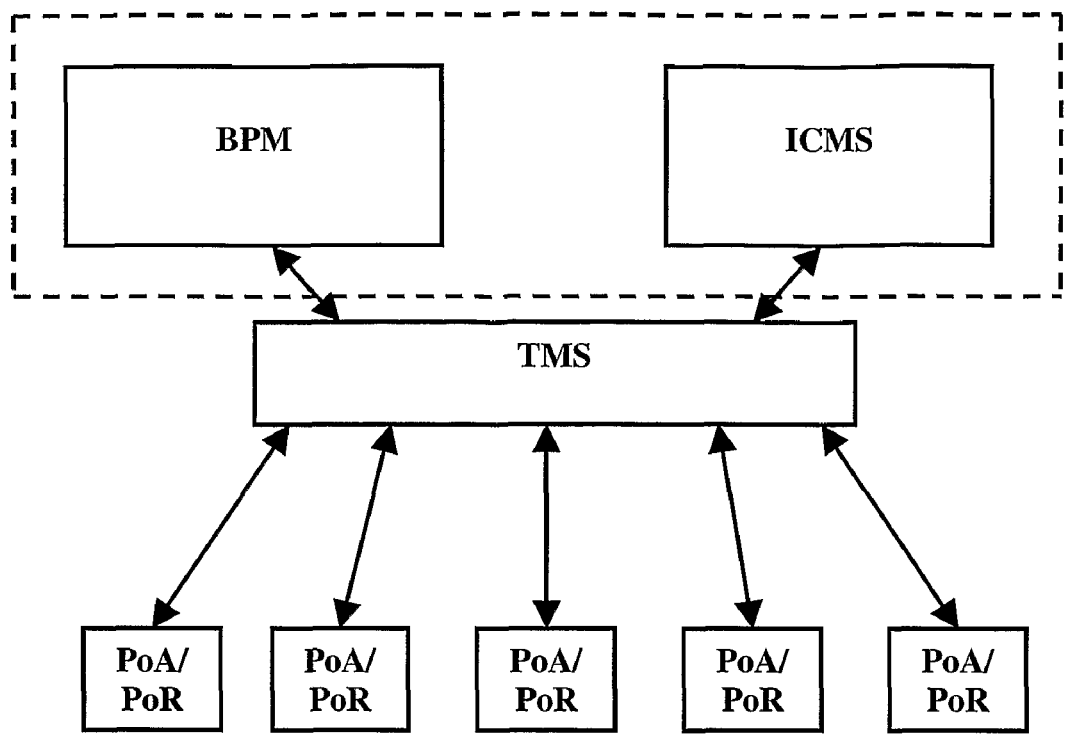
FIG. 4 is a schematic diagram of another system for authentication of the data carriers of FIGS. 1 and 2.

The system of FIG. 3 illustrates how the data carriers of FIGS. 1 and 2 can be used in a simple network, but in a preferred embodiment they are used in the product authentication system of FIG. 4. This is a brand protection system in accordance with the teachings of PCT/GB2007/001248, the contents of which are incorporated herein by reference. This has a brand protection management server (BPMS) that can communicate with point of registration (PoR) brand protection feature reader/writer devices and point of authentication (PoA) reader devices provided at various locations in a product distribution chain. The reader devices include brand protection feature readers for reading brand protection features/taggants on articles that are to be authenticated. Such taggants may, for example, include barcodes, one dimensional or two dimensional, RFID tags, fluorescent tags, or any other suitable taggant types. The reader devices may include user authentication devices such as, for example, smart card readers, for reading user identification information provided by a user for authentication purposes. In some cases the reader devices may also have a write capability so that they can generate brand protection features, e.g. taggants in labels, as well as read them. In a typical supply chain, a very large number of PoAs and PoRs are likely to be associated with the BPMS, possibly spread over a number of different countries.

The PoR devices are capable of generating brand protection features to be applied to new, that is not previously authenticated, articles, at a start or "registration" point. The PoR and PoA devices communicate with the brand protection management server system using whatever standard communication method is most appropriate for them, e.g. TCP/IP over LAN for fixed devices, or WiFi for portable devices or GSM etc. One or more PoR reader/writer devices may be linked/served using local networking such as WiFi or Ethernet, to a single Point of Registration (PoR) control device, e.g. a client Personal Computer (PC). Similarly several PoA devices may be linked/served in a similar manner by a main PoA device, e.g. a client personal computer (PC). In the description below references to the "PoA/PoR instrument" shall be understood to mean a PoA device or a PoR device or a single instrument in which a PoR and PoA device are combined.

Each PoA/PoR system contains a reader instrument, local networking capability, and in some cases may also include a security printer instrument and/or a local Personal Computer (PC). The reader instruments comprise brand protection feature (BPF) reader devices, for example barcode scanning devices, for reading BPFs on articles to be tracked/authenticated. Each PoA/PoR may also include a printing instrument to generate BPFs, for example labels, as well as read them. Each PoR may be capable of generating BPFs to be applied to new (i.e. not previously tracked) articles, at a start or registration point in the BPMS scheme. In addition, user authentication devices may be provided, for example, SMART card readers, for reading identification information provided by a user for authentication purposes.

Included at the brand protection server is a trust management system (TMS) for ensuring security across the entire platform and a brand protection management system for analysing and storing brand management data, and controlling brand related features or functions. Also provided at the server is an instrument configuration management system (ICMS) for storing known configurations, locations, users, and modalities of the PoRs and PoAs and enabling the configuration of the instruments to be managed by setting instrument policies and managing these for control of each PoR and PoA instrument in the system. The policies include control or configuration information specifying, for example, the type of brand protection feature that is to be read, the type of processing that is to be used to authenticate a particular brand protection feature, the grade or role of user approved to use the reader, the workflow; that is the steps that a user who is operating the reader has to take; and any other brand protection feature reader information. Included in the ICMS is a component of the trust management system, typically implemented on a Hardware Security Module (HSM) or some other tamper proof security component. All data flows to the instruments in the field through the TMS. To ensure local security, each PoR and PoA device includes its own trust management system component.

Brand protection systems will often be used by more than one brand owner and potentially by other organisations such as regulators. Each of these organisations may run their own brand protection system. Some aspects of the brand protection system will however have to be shared, for example to enable two brand owners to share the same PoR system at a manufacturing site or for a brand owner's information also to be shared with a regulator. The shared parts of the system provide a complete picture of the instruments in the field (while the brand owner's knowledge pertains only to his use of the instruments) and ensures that authentication events and instructions are routed to/from the brand owner's/regulator's brand protection system.

Each PoA/PoR reader instrument is loaded with brand protection instrument activity policies, as set by the ICMS. The instrument polices define the items that the instrument is able to authenticate and how to authenticate them. For example, each instrument activity policy may have three brand protection instrument activities that are definitions of the activities to be performed in different instrument states. These three activities may define how to authenticate in the default mode, how to authenticate where an initial part of a scanned code determines how to interpret the rest of the code (2 part scan), and how to authenticate when the type of item is first identified visually by the inspector, so a certain type of item is expected. For the present invention the policy may specify the security feature or combination of security features that is to be used to authenticate the data carrier. In the event that this is compromised, the IMCS can download a command to change the policy to cause the reader to read a different security feature or combination of security features.

Each instrument policy may be associated with a particular brand, and may identify the organisation the policy is associated with, and their hierarchy. When the hierarchy of all organisations using activities policies on the instrument is known, the instrument can use the hierarchy to pick the policy used by the highest-ranking organisation as its default or where there is a conflict of interest. Preferably, the hierarchy of each policy is also known, so that if more than one policy is known for an item, a different policy of a higher or lower ranking can be activated as required.

Policies may be associated only with instruments of a particular type. Some policies may only be relevant with the context of a particular PoA system. These policies may identify which instrument activities can be loaded onto the instruments. Each activity policy must be associated with the appropriate item type and brand-owner id for that policy. Typically, there is a default mode when no brands/items are selected. The brand protection instrument activities define all the aspects to do with the read/scan, such as what algorithms should be used, what script can be used, etc. Since the steps taken to verify a code could be highly complex, these are controlled by the associated activity policy and may involve the display of instructions on the instrument to the user. For example, the instructions might involve first scanning part of the code, and a next step to retrieve further instructions from the PoA or the BPMS. These instructions may in turn lead to further steps requiring instrument interaction with other parts of the system.

The system of FIG. 4 can be used in various different configurations. In a first example, the PoAs are able to authenticate the data carrier locally or off-line, that is without reference to the BPMS. In this case, authentication events captured at the PoAs would be stored at the instrument and sent to the BPMS for later analysis to identify possible anomalies. In another case, data captured by the readers is sent to the BPMS for authentication, and so in this case, authentication is done on-line. In either case, the ICMS is able to send change security feature command signals to one or more of the readers to cause them to switch from using a first security feature to a second security feature.

Any suitable covert security features 15 can be used for the authentication of the data carrier. These could be separately applied covert features or covert features that are integrated with the overt data carrier. Examples of separately applied covert features 15 include patterns applied with UV sensitive fluorescent inks that are invisible when not illuminated with UV light and/or random fluorescent components that are included in a carrier substrate. Examples of security features 15 that can be integrated into the overt data carrier 10 include fluorescent compounds that are included in the ink used to print the overt data carrier 10, which may be simply detected and/or its spectral properties analysed. The multiple features may take the form of different layers of fluorescent inks and/or different inks in specified areas of the barcode, with each area being assigned to be a different security feature 15.

Multiple virtual covert security features 15 can be extracted from a single physical feature. For example, the relative intensity of fluoresced light at two or more wavelengths could be determined, as could the ratio of the intensity of fluoresced light between first and second wavelengths and/or the ratio of intensity of fluoresced light between second and third wavelengths and so on. Also, multiple aspects of each physical security feature 15 can be used to create multiple layered security features 15, for example, a first security feature 15 could be the presence of a fluorescent pattern, a second security feature 15 could be the shape of the pattern and a third security feature 15 could be the wavelength ratios.

To increase security, the covert features 15 may be entangled with the data carrier. This may involve physically entangling the security feature with the data carrier, so that there is some degree of physical overlap. For example, the data carrier could be provided on a substrate that contains a hidden pattern only made visible by the use of the reader 20 and/or provided on top of an RFID tag that is embedded in the substrate. Another option is to use data entanglement to provide a link between the security feature and the data carrier. By this it is meant that data in the data carrier is used in some way to generate one or more of the security features. For example, the pattern of deposition of each security feature may be related to the data in the data carrier. Alternatively, data may be encoded onto the covert security features 15. This data can be used with known encryption technologies to provide increased security. An example of this would be including data encrypted with a key on a covert security feature 15 for use with a key encryption algorithm. The other key required to decode the encrypted data may be included on another covert security feature 15 or an overt data carrier 10 or assigned to a user or data carrier reading device 20 or available at the server 25.

Requiring the use of two encryption keys for the authentication of the data carrier 5 allows multiple users to have separable authentication with each user utilising a user specific key to obtain a user specific authentication code. This would make the data carrier 10 hard for other users to copy, as each user only has access to the data afforded by their own user specific key. Multiple keys may be provided on associated multiple covert security features 15. Hence, if a key were compromised, a different security feature 15 may be selected. In addition, encryption may be used to provide selective access to data on the data carrier 5 by disclosing certain security features 15 to certain classes of user to allow them to obtain only the keys contained on the disclosed features.

Another method for increasing the data content and security of covert security features 15 is the use of inter-related security features 15, whereby covert security features 15 are applied in a manner or pattern based upon known relationships between them. This gives the opportunity to authenticate by using a first feature, a second feature and a function of both features. This increases the number of security features 15 available and also increases security since determining the function of two features 15 requires both features 15 and the relationship between them to be detected and decoded.

Using two features 15 and a function of these two, provides additional benefits to parties in a supply or process chain wishing to provide authentication to other parties but also retain specific security features 15 for themselves. For example, if a substrate supplier sells a substrate to a converter who then sells the substrate on to a user, two covert security features 15 may be incorporated into the substrate's data carrier. The first covert security feature may be assigned to be used by the converter, the second covert feature may be assigned to the user, but the combined covert features retained by the supplier. Thus, each party can have individual assurance that the data carrier is genuine. The converter only knows about the first security feature 15 and can check this to ensure the substrate is genuine, the user can check the second security feature 15 and the supplier can check the function of the two. This arrangement is useful, for example, in allowing each party in the chain to determine that a returned product was genuinely originally sourced from that party by checking their own covert security feature 15.

A skilled person will appreciate that variations of the disclosed arrangements are possible without departing from the invention. For example, although various data carrier 10 types have been described in examples above, such as bar codes, a person skilled in the art would realise that the above system may be used with a range of suitable data carriers, such as machine readable number codes and two dimensional data matrices. Similarly, although examples of security features 15 have been given above, any suitable security feature known in the art may be used. In addition, whilst in the examples given above, the security features 15 are preferably covert, overt features may also be used. Additional authentication checks may also be carried out on the data. For example, by comparing at least part of any security data captured with data from an approved list. The data compared may be an entire data value. Accordingly the above description of the specific embodiment is made by way of example only and not for the purposes of limitation. It will be clear to the skilled person that minor modifications may be made without significant changes to the operation described.

The invention claimed is:

1. A method for authenticating a data carrier that is associated with at least two security features that are each attached to the data carrier and that can be independently used to authenticate the data carrier, the method comprising using a first one of the security features to authenticate the data carrier and switching to using a second security feature in place of the first security feature in response to a switch security feature command, where the switch security feature command indicates that the first security feature should no longer be used to authenticate the data carrier.

2. A method as claimed in claim 1 comprising sending a switch security feature command to at least one reader instrument that is reading the first security feature, thereby to cause the reader instrument to switch to reading the second security feature, wherein the at least one reader instrument is capable of reading both the first security feature and the second security feature.

3. A method as claimed in claim 1 wherein the switch security feature command is sent to the at least one reader instrument from a controller at a remote location, wherein the remote location is a location different than a location of the at least one reader instrument and the data carrier.

4. A method as claimed in claim 1, wherein at least one of the security features is covert.

5. A method as claimed in claim 4 wherein all of the security features are covert.

6. A method as claimed in claim 1, wherein at least one of the security features is contained within the footprint of the data carrier.

7. A method as claimed in claim 1, wherein at least one of the security features is separate from the data carrier.

8. A method as claimed in claim 1, wherein at least one of the security features is incorporated in the data carrier.

9. A method as claimed in claim 8 wherein the data carrier is printed using a print medium, such as ink, and at least one of the security features is included in the print medium.

10. A method as claimed in claim 8 wherein a fluorescent material is included in the print medium.

11. A method as claimed in claim 1 wherein two or more of the security features are readable from a single physical feature.

12. A method as claimed in claim 11 wherein the security features are two or more of the presence of a fluorescent pattern; the shape of a fluorescence pattern or the fluorescence wavelength.

13. A method as claimed in claim 1 comprising using at least one security feature that is entangled with the data carrier.

14. A method as claimed in claim 13 wherein the entangled security feature is physically entangled with the data carrier, so that there is at least some physical overlap.

15. A method as claimed in claim 14 wherein the entangled security feature and the data carrier are layered one above the other.

16. A method as claimed in claim 13 wherein at least one of the entangled security features is associated with data in the data carrier.

17. A method as claimed in claim 16 wherein a pattern or location of deposition of one or more of the security features is related to data in the data carrier.

18. A method as claimed in claim 16 wherein the security feature includes data from or related to the data in the data carrier.

19. A method as claimed in claim 18 wherein the data carrier data in the security feature is encrypted.

20. A method as claimed in claim 1 comprising using the first security feature and/or the second security feature in conjunction with at least one further security feature, thereby to authenticate the data carrier.

21. A method as claimed in claim 20 wherein first and/or second security feature are inter-related with at least a further security feature and the method further involves using the relationship between inter-related security features to authenticate the data carrier.

22. A system for authenticating a data carrier that is associated with at least two security features that are each attached to the data carrier and that can be independently used to authenticate the data carrier, the system being configured to use a first one of the security features to authenticate the data carrier and switch to using a second one of the security features in place of the first in response to a switch security feature command, where the switch security feature command indicates that the first security feature should no longer be used to authenticate the data carrier.

23. A system as claimed in claim 22 comprising a reader for reading both the first security feature and the second security feature.

24. A system as claimed in claim 22 comprising a plurality of readers for reading security features at a plurality of different locations.

25. A system as claimed in claim 23 wherein each reader is portable, preferably handheld.

26. A system as claimed in claim 22 configured to use the first security feature and/or the second security feature in conjunction with at least one further security feature, thereby to authenticate the data carrier.

27. A system as claimed in claim 22 including a control station that is operable to receive data captured from at least the first and second security features or data or information that is a function thereof.

28. A system as claimed in claim 27 wherein the control station is operable to generate and send the switch security feature command.

29. A data carrier that has associated with it two or more security features that are each attached to the data carrier, wherein the first security feature is usable to authenticate the data carrier independently of the second security feature, such that to authenticate the data carrier, a method uses a first one of the security features to authenticate the data carrier and switches to using a second security feature in place of the first security feature in response to a switch security feature command, where the switch security feature command indicates that the first security feature should no longer be used to authenticate the data carrier.

30. A data carrier as claimed in claim 29 wherein at least one of the security features is within the footprint of the data carrier.

31. A data carrier as claimed in claim 29 wherein at least one of the security features is entangled with the data carrier.

32. A data carrier as claimed in claim 31 wherein at least one or the security features is physically entangled with the data carrier.

33. A data carrier as claimed in claim 31, wherein the data carrier and at least one security feature are layered one above the other.

34. A product or item that has a data carrier and two or more associated security features that are each attached to the data carrier and for use in the method in claim 1, wherein the one security feature is usable to authenticate the data carrier independently of the other security feature, wherein the method uses a first one of the security features to authenticate the data carrier and switches to using a second security feature in place of the first security feature in response to a switch security feature command, where the switch security feature command indicates that the first security feature should no longer be used to authenticate the data carrier.

* * * * *